(12) United States Patent
Pan et al.

(10) Patent No.: US 12,519,163 B2
(45) Date of Patent: Jan. 6, 2026

(54) ENERGY STORAGE CABINET

(71) Applicant: SUNGROW POWER SUPPLY CO., LTD., Anhui (CN)

(72) Inventors: Feng Pan, Anhui (CN); Shengli Yu, Anhui (CN); Puyun Dong, Anhui (CN); Juntao Zhi, Anhui (CN); Feng Qin, Anhui (CN); Shangfang Dai, Anhui (CN); Xiaoxun Li, Anhui (CN); Yongqiang Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 243 days.

(21) Appl. No.: 17/160,147

(22) Filed: Jan. 27, 2021

(65) Prior Publication Data
US 2022/0059895 A1    Feb. 24, 2022

(30) Foreign Application Priority Data

Aug. 21, 2020 (CN) .......................... 202010849840.0

(51) Int. Cl.
*H01M 50/204* (2021.01)
*H01M 10/42* (2006.01)
(Continued)

(52) U.S. Cl.
CPC ....... *H01M 50/204* (2021.01); *H01M 10/425* (2013.01); *H01M 50/244* (2021.01);
(Continued)

(58) Field of Classification Search
CPC ............. H01M 50/20–296; H01M 2010/4271; H01M 10/425; H01M 50/296–298;
(Continued)

(56) References Cited

U.S. PATENT DOCUMENTS

2008/0199765 A1\*  8/2008  Yoon .................. H01M 10/425
                                                          429/91
2011/0076521 A1    3/2011  Shimizu et al.
(Continued)

FOREIGN PATENT DOCUMENTS

CN          204375820 U  *  6/2015  ............. Y02E 60/10
CN          209029457 U     6/2019
(Continued)

OTHER PUBLICATIONS

KR 20150106735 A-13 English Translation, accessed Aug. 15, 2024 (Year: 2024).*
(Continued)

*Primary Examiner* — Allison Bourke
*Assistant Examiner* — Bethany C Garcia
(74) *Attorney, Agent, or Firm* — PV IP PC; Christopher S. Ruprecht; Wei Te Chung

(57) ABSTRACT

The present application discloses an energy storage cabinet, including a battery management module and a battery assembly. The battery management module is located on the side wall of the battery assembly, and the battery management module is electrically connected to the battery assembly. In the energy storage cabinet according to the present application, because the battery management module is located on the side wall of the battery assembly, the mounting height of the battery management module is effectively reduced, which is convenient for workers to control the battery management module, further facilitates the operation of the energy storage cabinet, and improves the safety of workers operating the energy storage cabinet.

18 Claims, 13 Drawing Sheets

(51) Int. Cl.
*H01M 50/244* (2021.01)
*H01M 50/258* (2021.01)
*H01M 50/264* (2021.01)
*H01M 50/284* (2021.01)
*H01M 50/289* (2021.01)
*H01M 50/296* (2021.01)

(52) U.S. Cl.
CPC ....... *H01M 50/258* (2021.01); *H01M 50/264* (2021.01); *H01M 50/284* (2021.01); *H01M 50/289* (2021.01); *H01M 50/296* (2021.01); *H01M 2010/4271* (2013.01)

(58) Field of Classification Search
CPC ............. H01M 50/284; H01M 50/249; H01M 50/262; H01M 50/209; H01M 50/271; H01M 50/264; H01M 50/289; H01M 50/503; H01M 50/514; H01M 10/4257; H01M 10/482; H01M 10/613; H01M 10/48; H01M 10/6554; H01M 2220/20; H01M 10/486; H01M 10/4207; H01M 10/46; H01M 50/244; H01M 50/569; H01M 50/507; H01M 50/51; H01M 50/519; H01M 50/258; H01M 50/502; H01M 50/291; H01M 50/509; H01M 50/202; H01M 50/207; H01M 50/233; H01M 50/287; H01M 50/297; H01M 2010/2781; H01M 2010/4278; H01M 2220/10; H01M 2220/30; H01M 50/204–296; H01M 50/591; H02J 7/00; H02J 15/00; H02J 2207/20; H02J 7/0045; H02J 7/0042; H02J 3/32; H02J 7/00036; H02J 7/0013; H02J 7/0016; H02J 7/00043; H02J 7/00047; H02J 7/0029; H02J 7/0047; H02J 2310/40; H05K 5/00–0073; H05K 7/2039; Y02E 60/10; Y02E 70/30; Y02P 70/50; Y02T 10/70; Y10T 29/49108; B60L 50/64; B60K 1/00; H02M 7/003; H02M 7/537

See application file for complete search history.

(56) References Cited

U.S. PATENT DOCUMENTS

2011/0101794 A1\* 5/2011 Schroeder ........... H01M 50/209 320/101
2011/0206948 A1\* 8/2011 Asai ................... H01M 10/613 429/7
2013/0084480 A1 4/2013 Kim et al.
2013/0252033 A1 9/2013 Bocek et al.
2015/0079856 A1\* 3/2015 Zhao .................... H01R 13/187 439/816
2015/0111073 A1\* 4/2015 Deriha ................ H01M 50/298 429/61
2016/0126588 A1\* 5/2016 Despesse ............ H01M 50/258 429/61
2018/0331394 A1 11/2018 Inoue
2019/0237722 A1\* 8/2019 Gao .................... H01M 50/264
2020/0127259 A1\* 4/2020 Yoshida ............. H01M 50/298
2020/0251700 A1 8/2020 Toya et al.

FOREIGN PATENT DOCUMENTS

| | | | | |
|---|---|---|---|---|
| CN | 209133567 U | 7/2019 | | |
| CN | 210806350 U | 6/2020 | | |
| DE | 112018003689 T5 | \* 4/2020 | ......... | H01M 10/425 |
| EP | 2543093 A2 | 1/2013 | | |
| EP | 3522313 A1 | 8/2019 | | |
| EP | 3528314 A1 | 8/2019 | | |
| EP | 4037117 A1 | \* 8/2022 | | |
| JP | 2011216424 A | 10/2011 | | |
| JP | 2013125612 A | 6/2013 | | |
| JP | 2018206557 A | 12/2018 | | |
| JP | 2019046550 A | 3/2019 | | |
| JP | 2019537819 A | 12/2019 | | |
| KR | 20150106735 A | \* 9/2015 | ......... | H01M 10/425 |
| WO | WO-2011106851 A2 | 9/2011 | | |
| WO | 2020102909 A1 | 5/2020 | | |

OTHER PUBLICATIONS

CN_204375820_U—English Translation via PE2E Search (Year: 2024).\*
Extended European Search Report regarding Application No. 21151035.9 dated Jun. 25, 2021.
First Australian Office Action regarding Application No. 2021200027 dated Aug. 23, 2021.
Japanese Office Action regarding Application No. 2021-005167, dated Jan. 18, 2022.
European Office Action regarding Application No. 21151035.9, dated Jun. 3, 2024.
First Chinese Office Action regarding Application No. 202010849840.0, dated Oct. 23, 2024.

\* cited by examiner

ENERGY STORAGE CABINET

The present disclosure claims the priority to Chinese patent application No. 202010849840.0 titled "ENERGY STORAGE CABINET", filed with the China National Intellectual Property Administration on Aug. 21, 2020, which is incorporated herein by reference in its entirety.

FIELD

The present application relates to the technical field of batteries, and in particular to an energy storage cabinet.

BACKGROUND

As shown in FIGS. 1 to 5, a traditional energy storage cabinet includes a battery assembly 02, a base 01 and a battery management module 03, where the battery assemblies 02 are multiple, and are stacked in sequence from top to bottom. The battery management module 03 is mounted at the top of the top battery assembly 02 and electrically connected to the top battery assembly 02. The base 01 has a short-circuit connection function. The positive and negative output ends of the base 01 are electrically connected to the bottom battery assembly 02, and the top battery management module 03 is equipped with a circuit breaker 03-1.

When the energy storage cabinet is assembled, the bottom base 01 is first mounted, then the battery assembly 02 is mounted from top to bottom, and finally the top battery management module 03 is mounted. Ordinary energy storage cabinets do not have the function of charging other external electrical equipment, which is single in function, difficult in modification and not multifunctional.

Since the battery management module 03 is located at the top of the energy storage cabinet and the circuit breaker is located at the top, the manual control system has poor convenience and safety for external output on and off, after the numbers of the stacking layers exceed the comfortable operating height of human body.

Therefore, how to improve the safety of workers operating the energy storage cabinet is an urgent technical problem to be solved by those skilled in the art.

SUMMARY

An object of the present application is to provide an energy storage cabinet to improve the safety of workers operating the energy storage cabinet.

To achieve the above object, the present application provides an energy storage cabinet, including a battery management module and a battery assembly electrically connected to the battery management module. The battery management module is located on a side wall of the battery assembly.

Preferably, the energy storage cabinet further includes a base mounted below the bottommost battery assembly, and the base is provided with an electrical connection assembly whose two ends are respectively electrically connected to the bottommost battery assembly and the battery management module.

Preferably, the base is electrically connected to the battery assembly and the battery management module through a hot-plug assembly.

Preferably, the battery management module is mounted on the base, and the battery management module is detachably connected to the base, and the base is detachably connected to the battery assembly.

Preferably, the battery management module is electrically connected to the battery assembly through a hot-plug assembly or a cable assembly.

Preferably, the battery management module is mounted on the battery assembly.

Preferably, the battery management module is fixedly connected to the battery assembly in a detachable manner.

Preferably, one of the battery management module and the battery assembly is provided with a clamping groove, and the other is provided with a buckle for clamping the clamping groove. When the buckle is matched with the clamping groove, a side wall of the battery management module is fit with the side wall of the battery assembly.

Preferably, multiple battery assemblies are provided, all the battery assemblies are stacked in sequence from top to bottom, and two adjacent battery assemblies are detachably connected to each other.

Preferably, two adjacent battery assemblies are electrically connected through a hot-plug assembly or a cable assembly.

Preferably, the energy storage cabinet further includes a top cover mounted above the top battery assembly, where a power conversion module and/or a fuse electrically connected to the top battery assembly is arranged in the top cover, and the battery management module includes a circuit breaker and/or a relay.

Preferably, the power conversion module comprises a first positive terminal and a first negative terminal, and interface positions of the first positive terminal and the first negative terminal are reserved on the side, top or bottom of the top cover.

Preferably, the top cover is fixedly connected to the top battery assembly in the detachable manner.

Preferably, the battery assembly includes an outer shell and an electric core assembly. The outer shell includes a lower shell with an opening at a top end and an upper cover plate for blocking the lower shell, and the electric core assembly is placed in the inner cavity of the lower shell. One of a bottom end of the lower shell and a top end of the upper cover plate is provided with at least one first handle, and the other is provided with at least one first limiting groove for accommodating the first handle on the adjacent battery assembly, where the at least one first handle is in one-to one correspondence with the first limiting groove.

Preferably, the first handle is arranged on the upper cover plate, and the first limiting groove is arranged at the bottom end of the lower shell. The top end of the base is provided with a second handle mounted in the first limiting groove of the bottom battery assembly. The top cover is provided with a second limiting groove for mounting the first handle of the top battery assembly.

Preferably, the first handle is fixedly connected to the side wall of the first limiting groove matched with the first handle in the detachable manner. The second handle fixedly connected to the side wall of the first limiting groove matched with the second handle in the detachable manner. The first handle is fixedly connected to the side wall of the second limiting groove matched with the first handle in the detachable manner.

Preferably, the side wall of the lower shell is provided with a U-shaped groove body that opens outwards and is used for accommodating the battery management module.

Preferably, the outer shell further includes a sealing plate used for sealing the side opening of the U-shaped groove body, and the sealing plate is detachably connected to the lower shell.

Preferably, opposite side walls of the lower shell are provided with U-shaped sliding grooves with upper openings, and the sealing plate is slidably arranged in the U-shaped sliding grooves.

In the above technical solutions, the energy storage cabinet according to the present application includes a battery management module and a battery assembly, where the battery management module is positioned on the side wall of the battery assembly and is electrically connected to the battery assembly.

It can be seen from the above description that in the energy storage cabinet according to the present application, because the battery management module is located on the side wall of the battery assembly, the mounting height of the battery management module is effectively reduced, which is convenient for workers to control the battery management module, further facilitates the operation of the energy storage cabinet, and improves the safety of workers operating the energy storage cabinet.

BRIEF DESCRIPTION OF THE DRAWINGS

For more clearly illustrating embodiments of the present application or technical solutions in the conventional technology, the drawing referred to for describing the embodiments or the conventional technology will be briefly described hereinafter. Apparently, the drawings in the following description are only some examples of the present application, and for those skilled in the art, other drawings may be obtained based on the provided drawing without any creative efforts.

Figure 1:
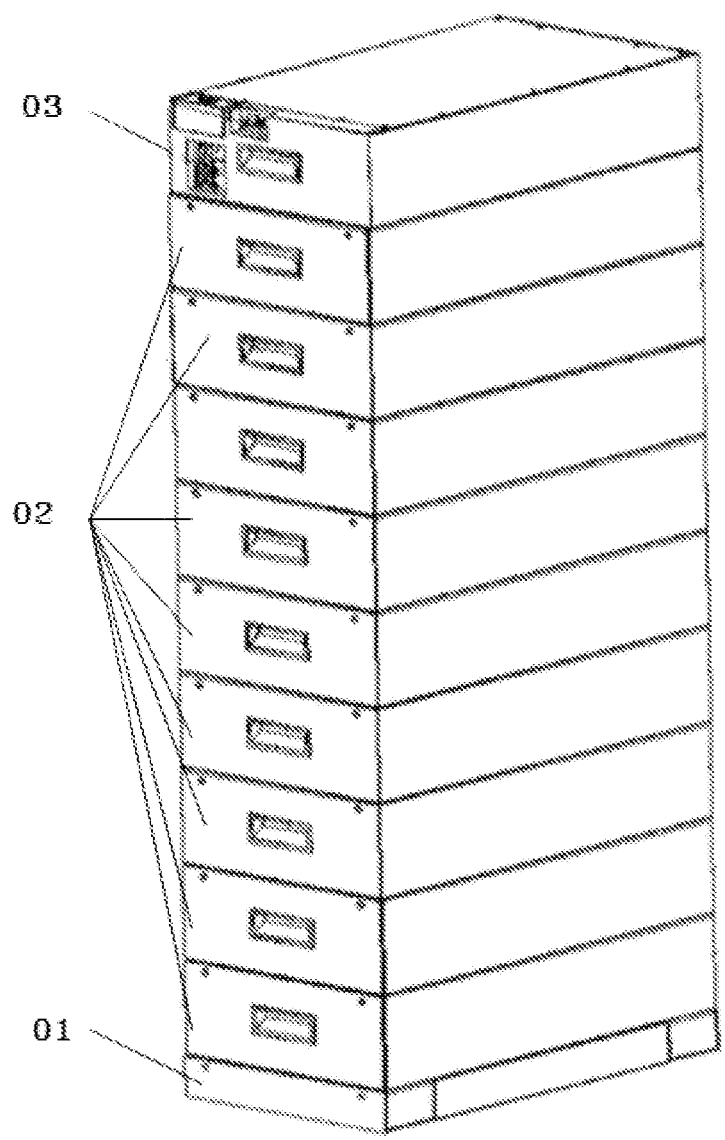
FIG. 1 is a schematic diagram showing the structure of a conventional energy storage cabinet.
Figure 2:
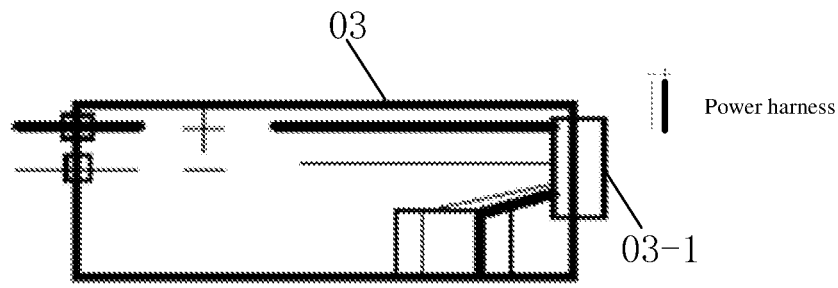
FIG. 2 is a circuit connection distribution diagram of a conventional battery management module.
Figure 3:
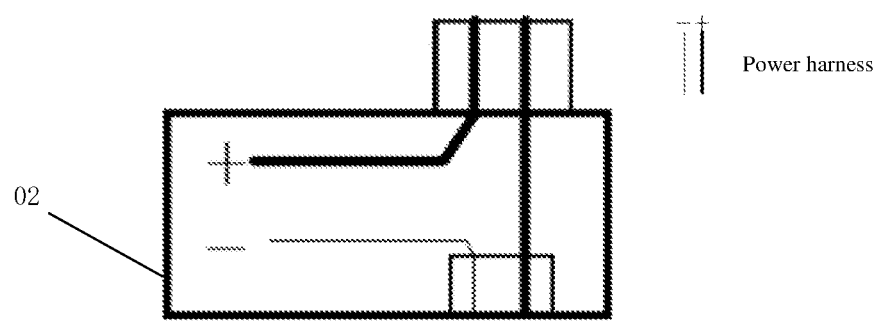
FIG. 3 is a circuit connection distribution diagram of a conventional battery assembly.
Figure 4:
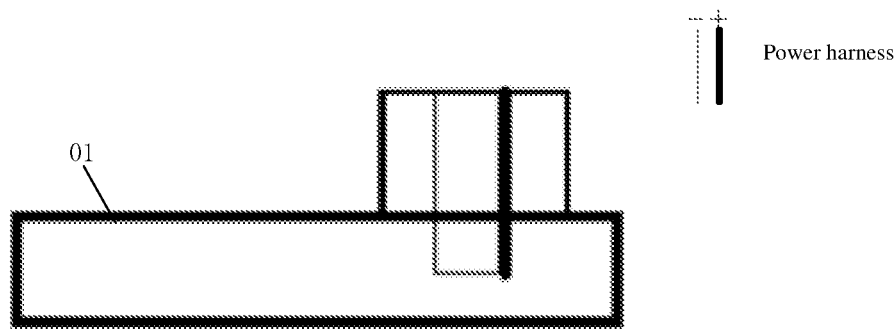
FIG. 4 is a circuit connection distribution diagram of a conventional base.
Figure 5:
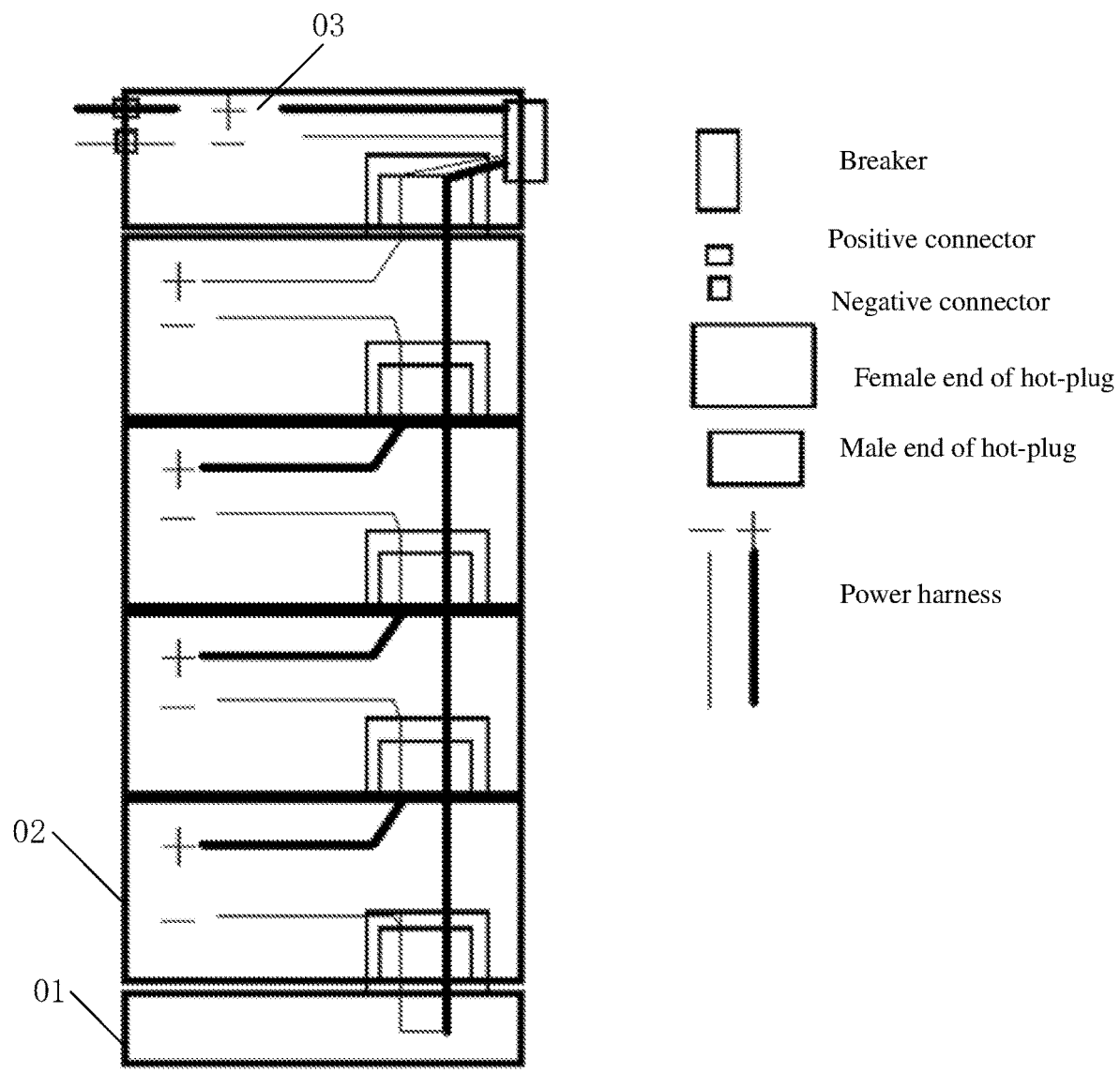
FIG. 5 is a circuit connection distribution diagram of a conventional energy storage cabinet.
Figure 6:
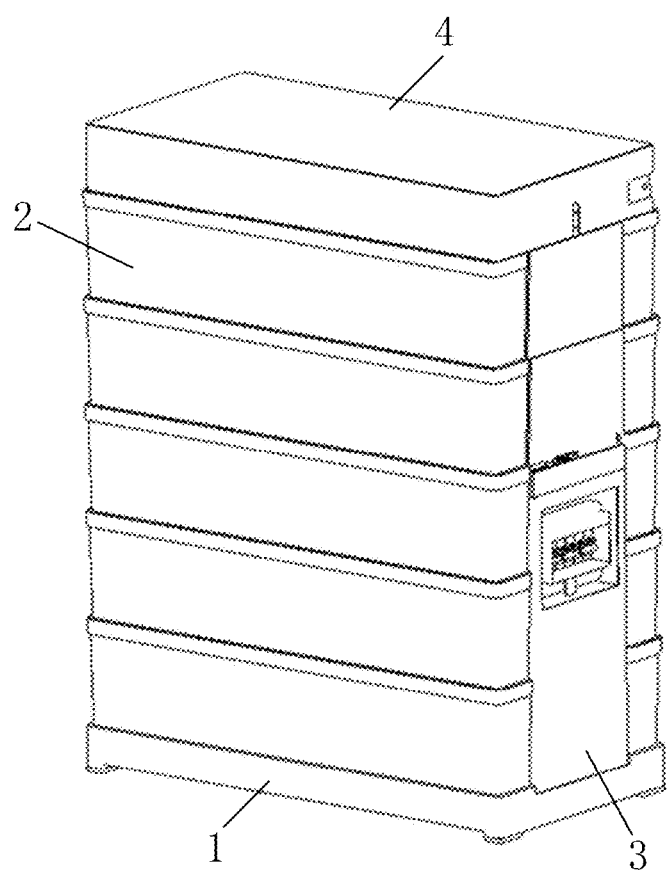
FIG. 6 is a three-dimensional structural diagram of an energy cabinet according to an embodiment of the present application.
Figure 7:
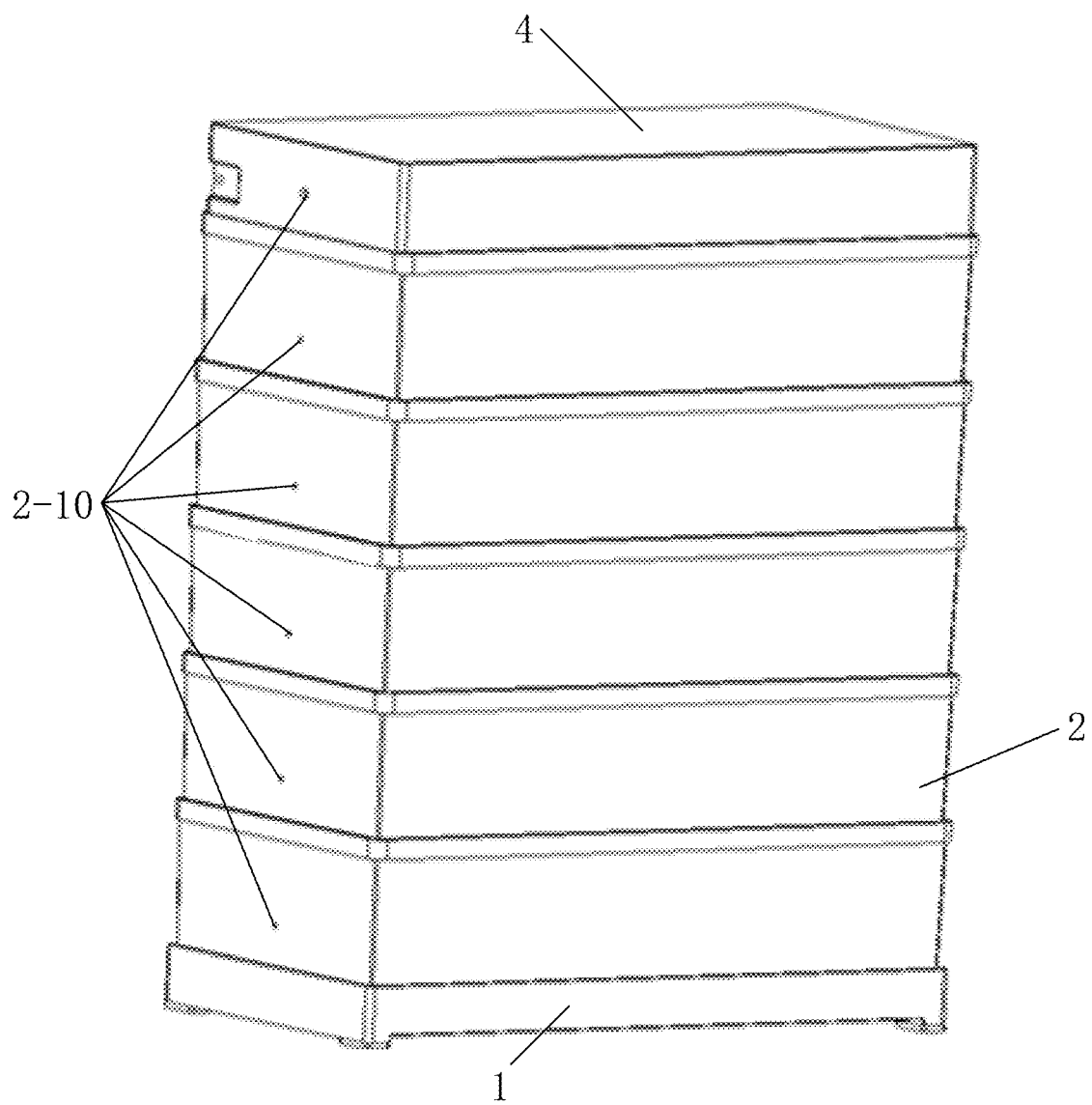
FIG. 7 is a three-dimensional structural diagram of an energy cabinet from another perspective according to an embodiment of the present application.
Figure 8:
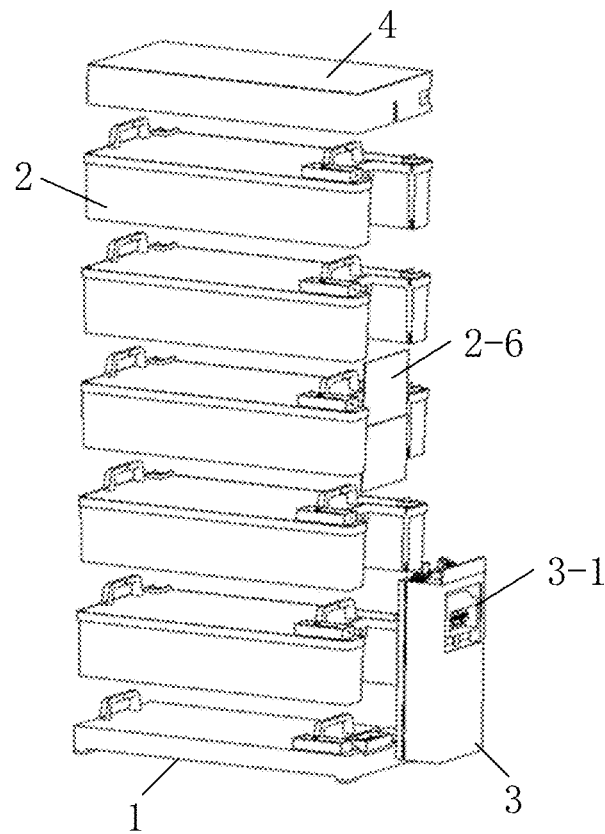
FIG. 8 is an exploded view of an energy cabinet according to an embodiment of the present application.
Figure 9:
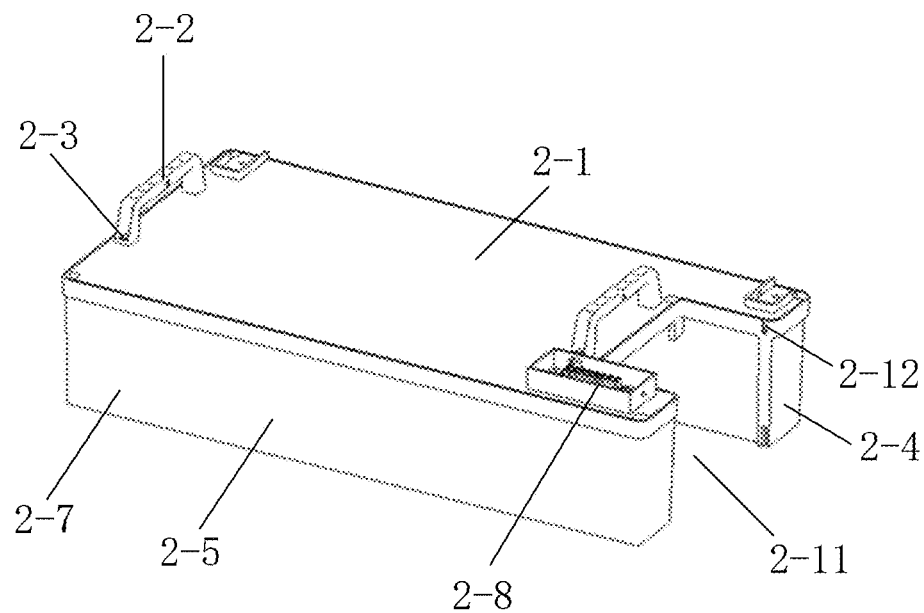
FIG. 9 is a three-dimensional structural diagram of a battery assembly according to an embodiment of the present application.
Figure 10:
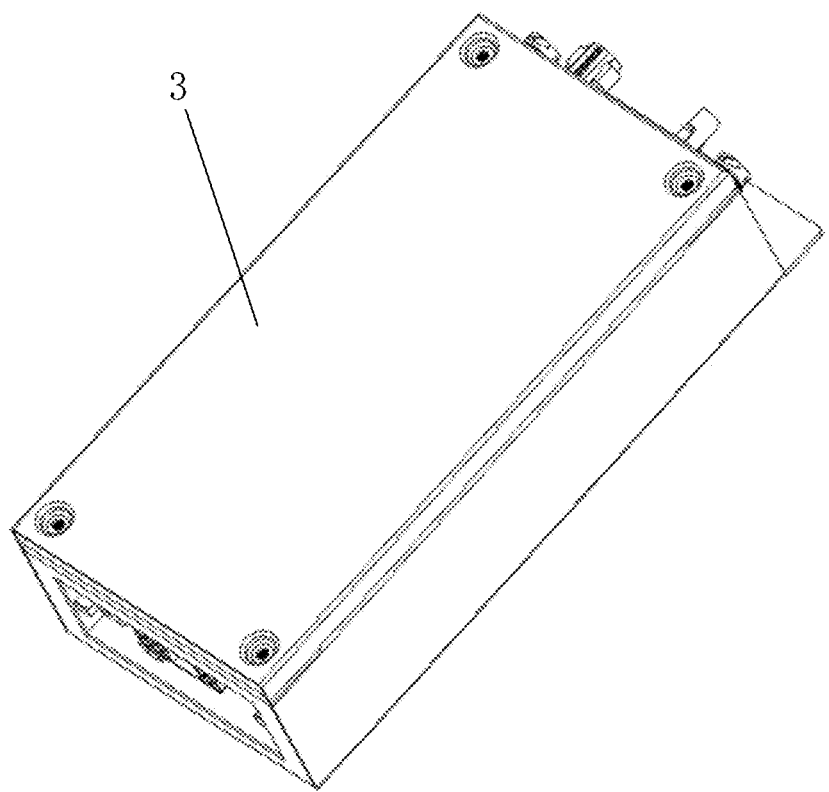
FIG. 10 is a three-dimensional structural diagram of a battery management module according to an embodiment of the present application.
Figure 11:
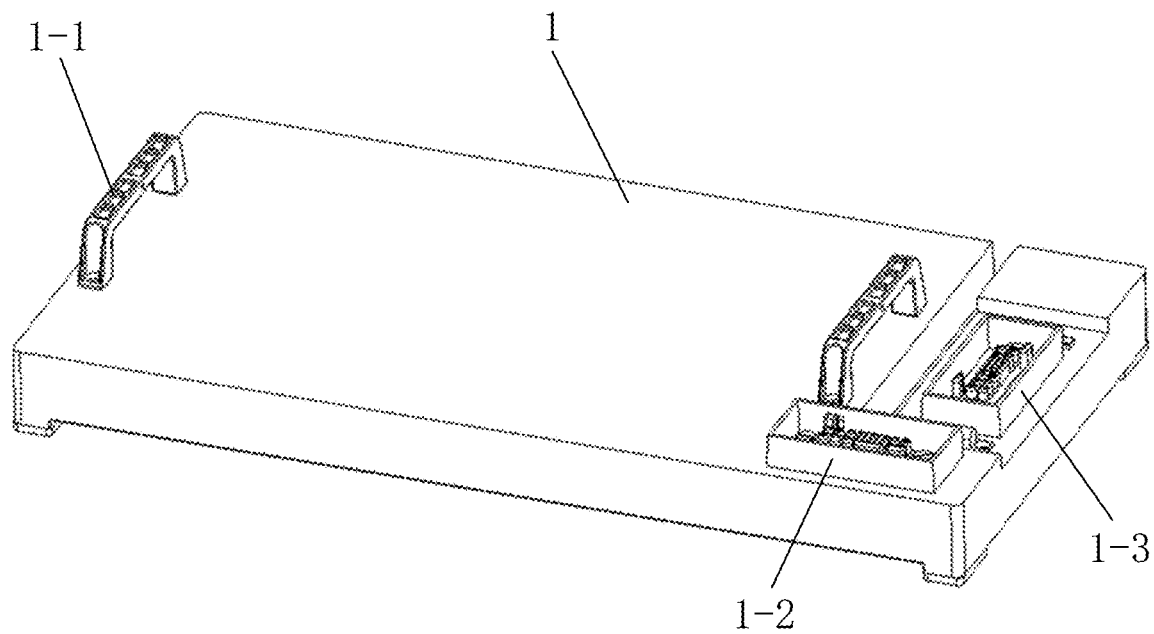
FIG. 11 is a three-dimensional structural diagram of a base according to an embodiment of the present application.
Figure 12:
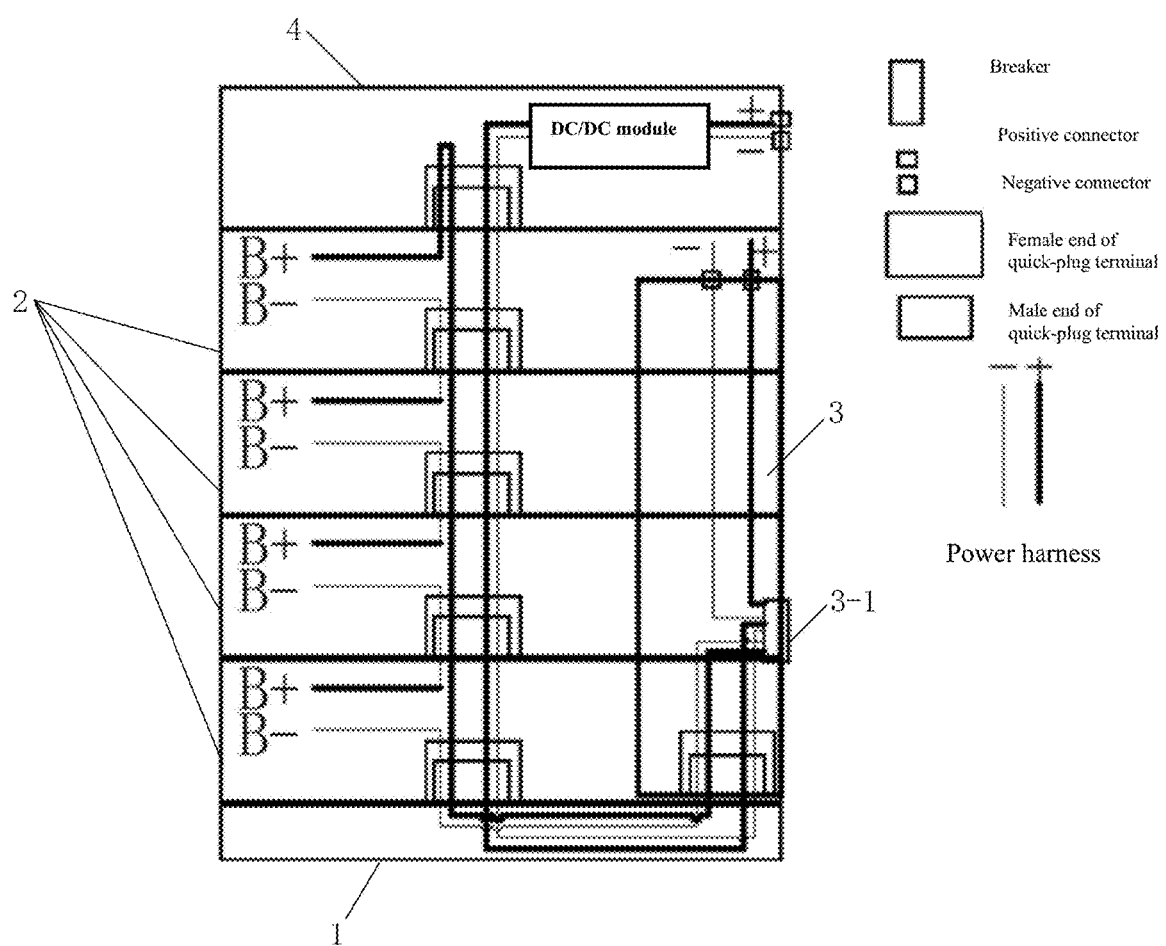
FIG. 12 is a circuit connection distribution diagram of an energy storage cabinet according to an embodiment of the present application.
Figure 13:
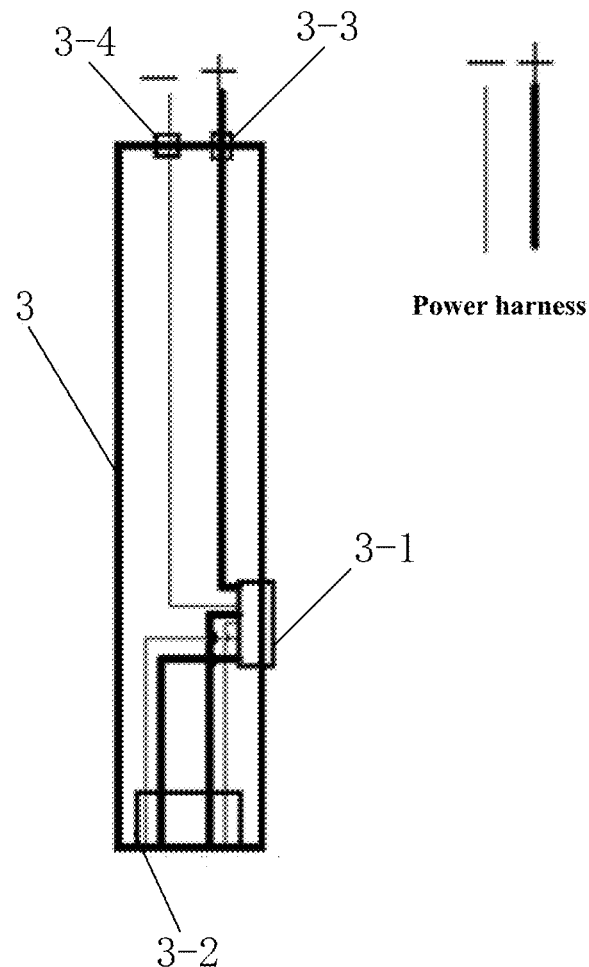
FIG. 13 is a circuit connection distribution diagram of a battery management module according to an embodiment of the present application.
Figure 14:
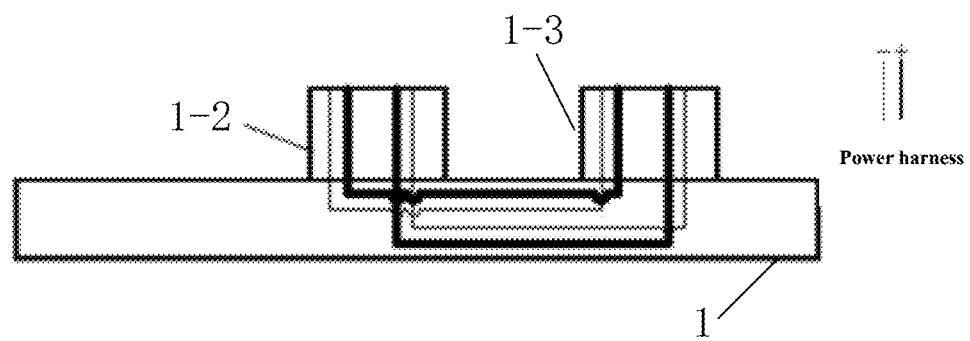
FIG. 14 is a circuit connection distribution diagram of a base according to an embodiment of the present application.
Figure 15:
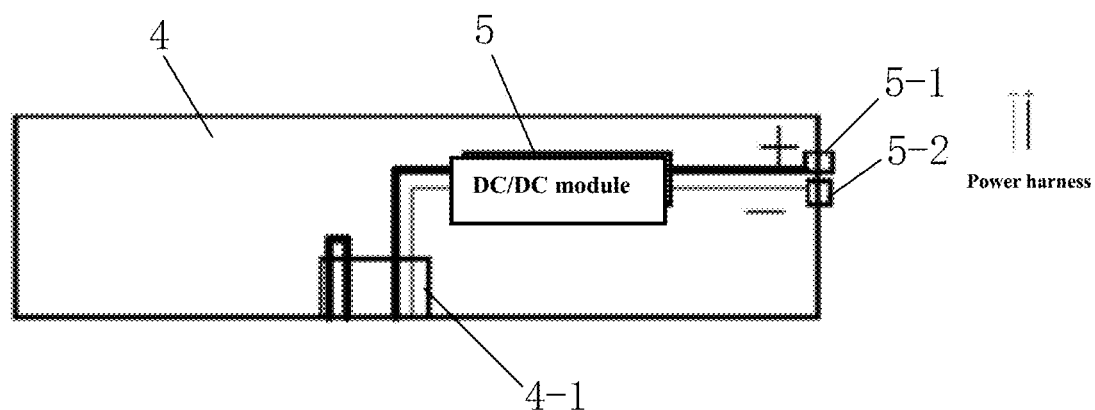
FIG. 15 is a circuit connection distribution diagram of a top cover according to an embodiment of the present application.
Figure 16:
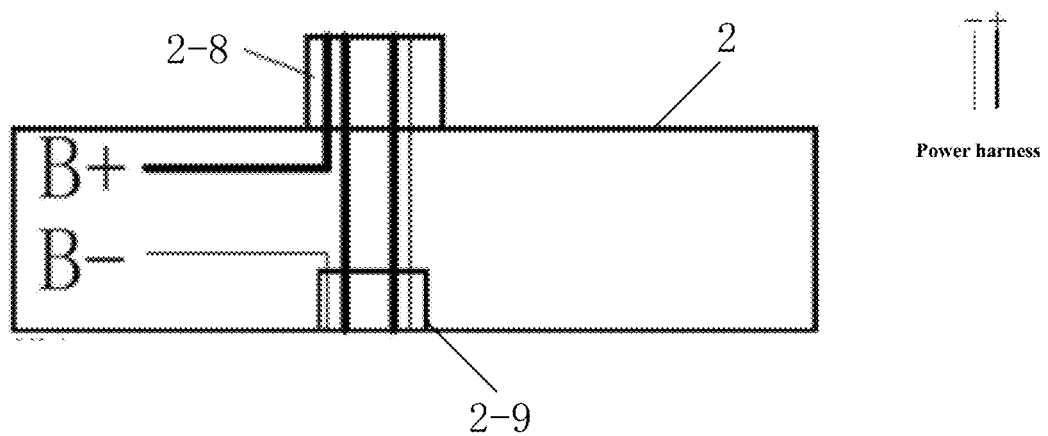
FIG. 16 is a circuit connection distribution diagram of a battery assembly according to an embodiment of the present application.
Figure 17:
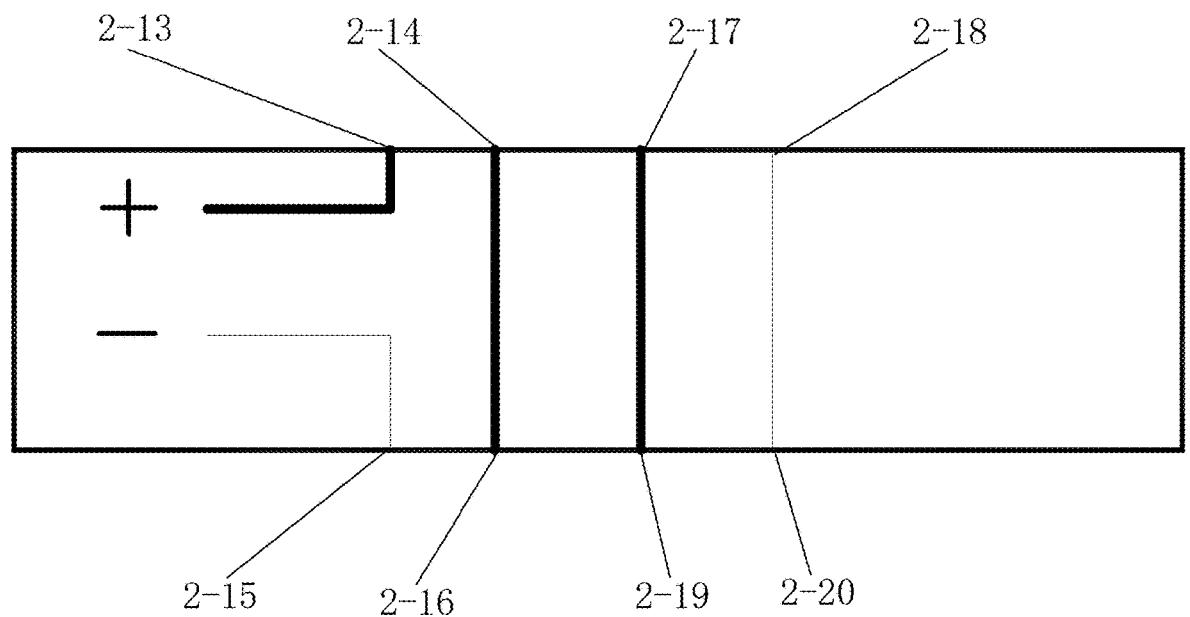
FIG. 17 is a circuit connection distribution diagram of another battery assembly according to an embodiment of the present application.
Figure 18:
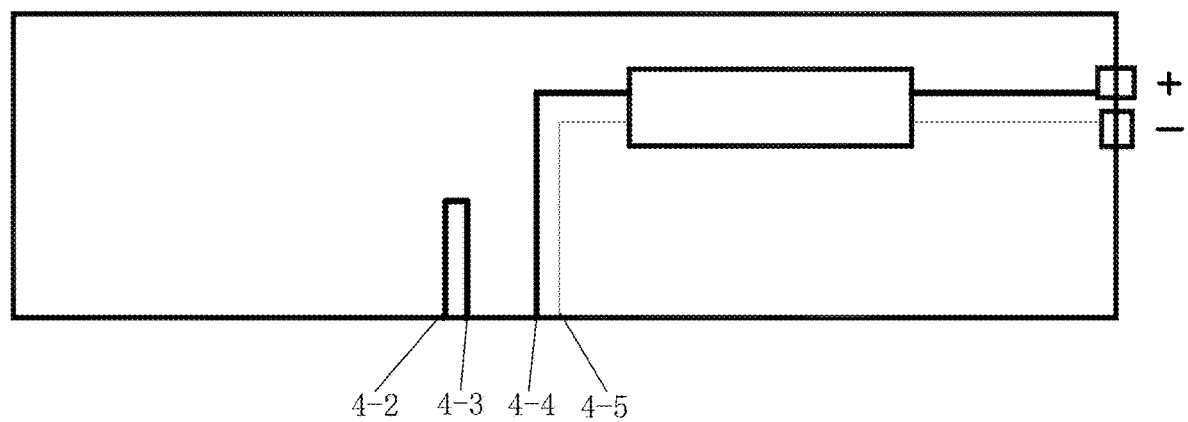
FIG. 18 is a circuit connection distribution diagram of another top cover according to an embodiment of the present application.
Figure 19:
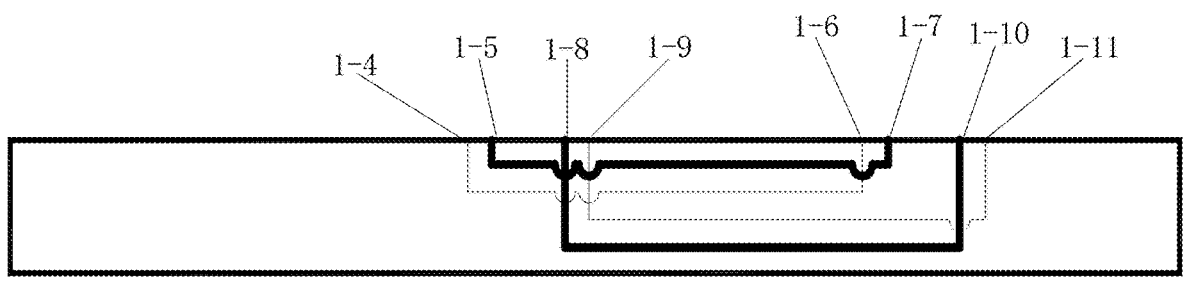
FIG. 19 is a circuit connection distribution diagram of another base according to an embodiment of the present application.
Figure 20:
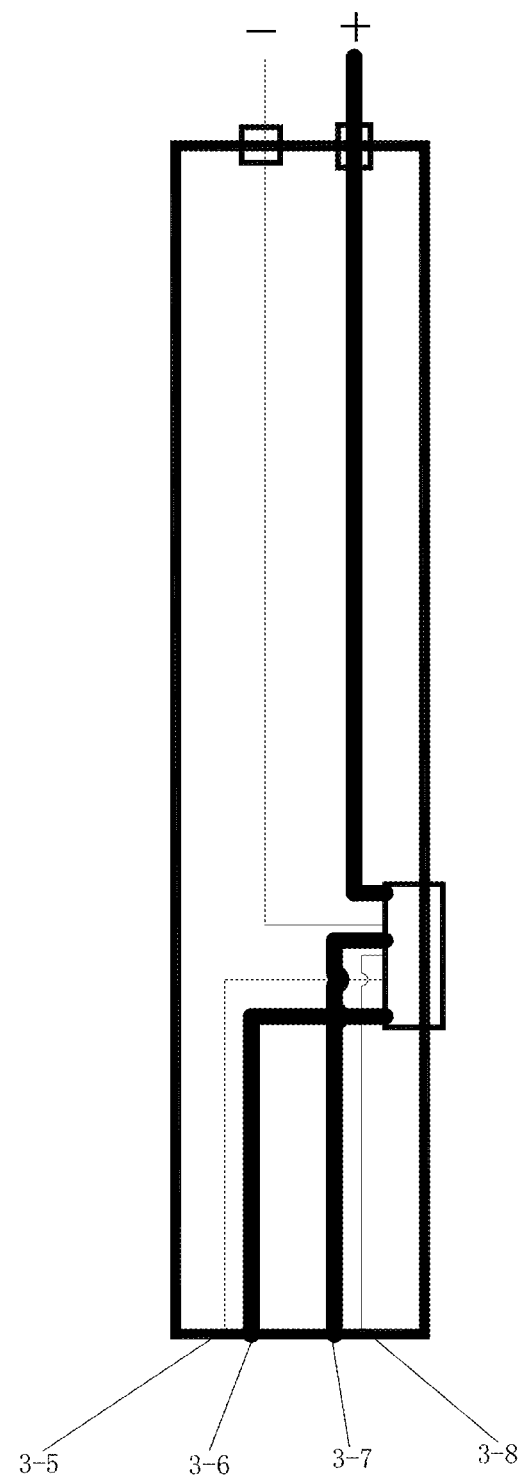
FIG. 20 is a circuit connection distribution diagram of another battery management module according to an embodiment of the present application.

Reference numerals in FIGS. 1 to 20:

| | |
|---|---|
| 01 | base |
| 02 | battery assembly |
| 03 | battery management module |
| 03-1 | circuit breaker |
| 1 | base |
| 1-1 | second handle |
| 1-2 | hot-plug assembly of first base |
| 1-3 | hot-plug assembly of second base |
| 1-4 | seventh connection terminal |
| 1-5 | eighth connection terminal |
| 1-6 | ninth connection terminal |
| 1-7 | tenth connection terminal |
| 1-8 | nineteenth connection terminal |
| 1-9 | twentieth connection terminal |
| 1-10 | twenty-first connection terminal |
| 1-11 | twenty-second connection terminal |
| 2 | battery assembly |
| 2-1 | upper cover plate |
| 2-2 | first handle |
| 2-3 | threaded fastener |
| 2-4 | short side wall |
| 2-5 | lower shell |
| 2-6 | sealing plate |
| 2-7 | long side wall |
| 2-8 | hot-plug assembly of first battery |
| 2-9 | hot-plug assembly of second battery |
| 2-10 | mounting hole |
| 2-11 | U-shaped groove body |
| 2-12 | U-shaped sliding groove |
| 2-13 | first connection terminal |
| 2-14 | second connection terminal |
| 2-15 | third connection terminal |
| 2-16 | fourth connection terminal |
| 2-17 | fifteenth connection terminal |
| 2-18 | sixteenth connection terminal |
| 2-19 | seventeenth connection terminal |
| 2-20 | eighteenth connection terminal |
| 3 | battery management module |
| 3-1 | circuit breaker |
| 3-2 | hot-plug assembly of power supply |
| 3-3 | second positive connector |
| 3-4 | second negative connector |
| 3-5 | eleventh connection terminal |
| 3-6 | twelfth connection terminal |
| 3-7 | twenty-third connection terminal |
| 3-8 | twenty-fourth connection terminal |
| 4 | top cover |
| 4-1 | hot-plug assembly of top cover |
| 4-2 | fifth connection terminal |
| 4-3 | sixth connection terminal |
| 4-4 | thirteenth connection terminal |
| 4-5 | fourteenth connection terminal |
| 5 | power conversion module |
| 5-1 | first positive terminal |
| 5-2 | first negative terminal |

DETAILED DESCRIPTION OF EMBODIMENTS

A core of the present application is to provide an energy storage cabinet, so as to improve the safety of workers operating the energy storage cabinet.

In order to enable those skilled in the art to better understand the technical solutions of the present application, the present application will be further described in detail below with reference to the accompanying drawings and embodiments.

FIGS. 6 to 20 are referred.

In a specific embodiment, the energy storage cabinet according to an embodiment of the present application includes a battery management module 3 and a battery assembly 2. The battery management module 3 is located on the side wall of the battery assembly 2, and the battery management module 3 is electrically connected to the battery assembly 2.

Preferably, there are multiple battery assemblies 2, all the battery assemblies 2 are stacked in sequence from top to bottom, and two adjacent battery assemblies 2 are electrically connected. Preferably, the number of the battery assemblies 2 is greater than or equal to 3.

The battery management module 3 may be mounted on the battery assembly 2, and the battery management module 3 is mounted on the side wall of the battery assembly 2. Specifically, the battery management module 3 may be electrically connected to the battery assembly 2 in a direct manner; and preferably, the battery management module 3 is connected to the battery assembly 2 through a hot-plug assembly or a cable assembly.

To facilitate disassembly and assembly, it is preferable that the battery management module 3 is fixedly connected to the battery assembly 2 in a detachable manner. Specifically, the battery management module 3 and the battery assembly 2 may be connected by buckles or threaded fasteners.

Specifically, one of the battery management module 3 and the battery assembly 2 is provided with a clamping groove, and the other is provided with a buckle for clamping the clamping groove. When the buckle is matched with the clamping groove, the side wall of the battery management module 3 is fit with the side wall of the battery assembly 2.

In another embodiment, the battery management module 3 is electrically connected to the battery assembly 2 in an indirect manner. The battery management module 3 is connected to the battery assembly 2 through external components.

In a specific embodiment, the energy storage cabinet further includes a base 1 mounted below the bottommost battery assembly 2, and an electrical connection assembly with both ends electrically connected to the bottommost battery assembly 2 and the battery management module 3 is arranged in the base 1.

To facilitate disassembly and assembly, it is preferable that the base 1 is electrically connected to the battery assembly 2 and the battery management module 3 through the hot-plug assembly.

In a specific embodiment, the battery management module 3 is mounted on the base 1, and the battery management module 3 is detachably connected to the base 1, and the base 1 is detachably connected to the battery assembly 2.

Two adjacent battery assemblies 2 are electrically connected through hot-plug assemblies or cable assemblies, and two adjacent battery assemblies 2 are detachably connected to each other. The top cover 4 is fixedly connected to the top battery assembly 2 in a detachable manner. In this application, the detachable connection can be realized by threaded connection or buckle connection.

In a specific embodiment, the energy storage cabinet further comprises a top cover 4 mounted on the top battery assembly 2, and a power conversion module 5 electrically connected to the top battery assembly 2 is arranged in the top cover 4. Of course, the top cover 4 may further be provided with a fuse.

The battery management module 3 includes a circuit breaker and/or a relay, and when the circuit breaker is provided, the circuit breaker is electrically connected to the power conversion module 5.

Specifically, interface positions of the first positive terminal 5-1 and the first negative terminal 5-2 of the power conversion module 5 are reserved on the side, top or bottom of the top cover 4.

When there are multiple battery assemblies 2, all the battery assemblies 2 are the first battery assembly, the second battery assembly . . . the M−1 battery assembly and the M battery assembly, and the first battery assembly, the second battery assembly, the M−1 battery assembly and M battery assembly are sequentially stacked from bottom to top.

Each battery assembly 2 is provided with a first connection terminal 2-13 and a second connection terminal 2-14 located at the top of the battery assembly 2, and a third connection terminal 2-15 and a fourth connection terminal 2-16 located at the bottom of the battery assembly 2. The first connection terminal 2-13 and the third connection terminal 2-15 are a pair of connection terminals from which the positive and negative electrodes of the battery in the battery assembly 2 are led out, and the second connection terminal 2-14 is connected to the fourth connection terminal 2-16 through the internal wiring of the battery assembly 2.

The top cover 4 is provided with a fifth connection terminal 4-2 and a sixth connection terminal 4-3 for electrical connection. The fifth connection terminal 4-2 is electrically connected to the first connection terminal 2-13 of the M battery assembly. The sixth connection terminal 4-3 is electrically connected to the second connection terminal 2-14 of the M battery assembly.

The third connection terminal 2-15 of the upper battery assembly 2 of the two adjacent battery assemblies 2 is connected to the first connection terminal 2-13 of the lower battery assembly 2. The fourth connection terminal 2-16 of the upper battery assembly 2 is connected to the second connection terminal 2-14 of the lower battery assembly 2 to realize the electrical connection between the top and the bottom of the battery assembly.

The base 1 is provided with a seventh connection terminal 1-4, an eighth connection terminal 1-5, a ninth connection terminal 1-6 and a tenth connection terminal 1-7. The seventh connection terminal 1-4 and the ninth connection terminal 1-6 are communicated through the internal wiring, and the eighth connection terminal 1-5 and the tenth connection terminal 1-7 are communicated through the internal wiring. The seventh connection terminal 1-4 is connected to the third connection terminal 2-15 of the first battery assembly, and the eighth connection terminal 1-5 is connected to the fourth connection terminal 2-16 of the first battery assembly. The ninth connection terminal 1-6 and the tenth connection terminal 1-7 are respectively electrically connected to the positive and negative terminals of the battery management module 3.

The battery management module 3 includes a circuit breaker 3-1. Specifically, the side wall of the battery management module 3 is provided with a second positive connector 3-3 and a second negative connector 3-4 connected to the circuit breaker 3-1, and the circuit breaker 3-1 is provided on the side wall of the battery management module 3. Of course, in the actual production process, the positions of the circuit breaker 3-1, the second positive connector 3-3 and the second negative connector 3-4 may be changed as required.

The battery management module 3 is provided with an eleventh connection terminal 3-5 and a twelfth connection terminal 3-6 connected to the circuit breaker 3-1. The eleventh connection terminal 3-5 is connected to the ninth connection terminal 1-6, and the twelfth connection terminal 3-6 is connected to the tenth terminal 1-7.

The battery assembly 2 may be a conventional battery assembly, and the internal circuit is the same as the conventional circuit connection.

Preferably, the battery management module 3 of the present application is placed on the side wall of the battery assembly 2 and the upper part of the base 1, preferably projected from top to bottom, and the top cover 4, the battery assembly 2 and the battery management module 3 are projected in the projection of the base 1.

From the above description, it can be known that in the energy storage cabinet according to the specific embodiment of the present application, because the wires in the base 1 are not conductive during the mounting process, the connection ports of the battery assembly 2 are free of voltage during the stacking process or the disassembly process, which makes the mounting and disassembly process safe and reliable. That is, the present application adopts a safe power line connection solution, which has high electrical safety and no risk of electric shock to personnel during stacking mounting and maintenance. During the mounting process, the circuit breaker 3-1 of the battery management module 3 is always turned off, and the wires in the base 1 are not conductive, so the port of the quick plug-in assembly of the module is free of voltage during the stacking process, which is safe and reliable during the mounting process. Therefore, the safety of workers in disassembling and assembling the energy storage cabinet is improved.

In this application, the battery management module 3 is mounted from the top layer to the lower position of the side part of the energy storage cabinet; in the mounting process, the height of the battery management module 3 remains unchanged, and the height of the battery management module 3 will not increase with the increase of the stacking height. The height of the battery management module 3 is moderate, which is convenient for mounting, wiring and later maintenance, and improves the safety of workers operating the energy storage cabinet.

The battery assembly 2 is connected to the battery management module 3 in power and signal manner on the base 1.

Specifically, the base 1 is equipped with two quick-plug terminals, namely the hot-plug assembly of first base 1-2 and the hot-plug assembly of second base 1-3. Specifically, the hot-plug assembly of first base 1-2 and the hot-plug assembly of second base 1-3 may both be female connector terminals.

The battery management module 3 is equipped with two quick-plug terminals, which are the output terminal of the circuit breaker and the connector port of the power. The output terminal of the circuit breaker and the connector port of the power may both be male connector terminals.

The current loop of the battery assembly 2 is connected in sequence through the hot-plug assembly of the first battery 2-8 and the hot-plug assembly of the second battery 2-9, and is arranged in series. The hot-plug assembly of the first battery 2-8 of one of two adjacent battery assemblies 2 is connected to the hot-plug assembly of the second battery 2-9 of the other of the two battery assemblies 2. Independent modular battery module is designed, battery expansion and cutting is flexible, it is not limited by the size and space of the cabinet itself, and no additional cabinets are required. In a specific embodiment, the battery assembly 2 includes an outer shell, and the outer shell includes a lower shell 2-5 with an open at a top end and an upper cover 2-1 for blocking the lower shell 2-5. One of a bottom end of the lower shell 2-5 and a top end of the upper cover plate 2-1 is provided with at least one first handle 2-2, and the other is provided with at least one first limiting groove for accommodating the first handle 2-2 on the adjacent battery assembly 2, the at least one first handle 2-2 is in one-to one correspondence with the first limiting groove. Preferably, the upper cover plate 2-1 is detachably connected to the lower shell 2-5. Preferably, the first handle 2-2 is mounted by a threaded fastener 2-3.

The lower shell 2-5 is provided with a short side wall 2-4 and a long side wall 2-7 perpendicular to the short side wall 2-4, and the battery management module 3 is preferably mounted on the short side wall 2-4.

Specifically, the first handle 2-2 may be arranged at the bottom end of the lower shell 2-5, and the first limiting groove is arranged on the upper cover plate 2-1.

In another specific embodiment, the first handle 2-2 is arranged on the upper cover plate 2-1, and the first limiting groove is arranged at the bottom end of the lower shell 2-5. The top end of the base 1 is provided with a second handle 1-1 mounted in the first limiting groove of the bottom battery assembly 2, and the top cover 4 is provided with a second limiting groove for mounting the first handle 2-2 of the top battery assembly 2. Preferably, the first handle 2-2 and the second handle 1-1 are handles with the same structure.

Preferably, the first handle 2-2 is fixedly connected to the side wall of the first limiting groove matched with the first handle in a detachable manner. The second handle 1-1 is fixedly connected to the side wall of the first limiting groove matched with the second handle in the detachable manner. The first handle 2-2 is fixedly connected to the side wall of the second limiting groove matched with the first handle in the detachable manner. Specifically, the side wall of the lower shell 2-5 is provided with mounting holes 2-10 matched with the first handle 2-2, and the first handle 2-2 and the second handle 1-1 can be fastened with the lower shell 2-5 or the top cover 4 through threaded fasteners. Specifically, threaded fasteners may be mounting holes 2-10. In this application, the first handle 2-2 and the second handle 1-1 are limited by the first limiting groove and the second limiting groove, and locked by the threaded fasteners, so that the first handle 2-2 and the second handle 1-1 integrate the dual functions of limiting and fastening, without extra handles, saving space and cost.

In order to facilitate taking and placing the battery assemblies 2, it is preferable that each battery assembly 2 is provided with two of the first handles 2-2 and two of the first limiting grooves.

In a specific embodiment, the side wall of the lower shell 2-5 is provided with a U-shaped groove 2-11 that opens outwards and is used to accommodate the battery management module 3. Specifically, the height of the battery management module 3 is preferably an integer multiple of the height of the battery assembly 2. By arranging the U-shaped groove body 2-11 for accommodating the battery management module 3, the energy storage cabinet has an overall appearance, is convenient to place, and has high overall stability.

Preferably, the outer shell further includes a sealing plate 2-6 for sealing the side opening of the U-shaped groove body 2-11, and the sealing plate 2-6 is detachably connected to the lower shell 2-5. The sealing plate 2-6 may be connected to the lower shell 2-5 through fasteners.

In order to facilitate disassembly and assembly of the sealing plate 2-6, preferably, two opposite side walls of the lower shell 2-5 are provided with U-shaped sliding grooves 2-12 with upper openings, and the sealing plate 2-6 is slidably arranged in the U-shaped sliding grooves 2-12. Specifically, there are two U-shaped sliding grooves 2-12, and the opposite ends of the sealing plate 2-6 respectively extend into the corresponding U-shaped sliding grooves 2-12. The sealing plate 2-6 slides along the U-shaped sliding groove 2-12 during disassembly and assembly, which is simple and convenient to operate.

On the basis of the above solutions, it is preferable that the energy storage cabinet further includes a power conversion module 5, which is connected to the circuit breaker 3-1. Specifically, the circuit breaker 3-1 may electrically connect the power conversion module 5 and the battery assembly 2.

The power conversion module 5 is the DC/DC power conversion module 5, which realizes the functional compatible coupling between the energy storage machine and the charger machine, saving cost and space.

Specifically, the power conversion module 5 is located in the inner cavity of the top cover 4, and the top cover 4 is provided with a first positive terminal 5-1 and a first negative terminal 5-2 for connecting with the circuit output of the power conversion module 5. A power conversion module 5 is added to the top cover 4, so that the energy storage cabinet can store energy, and can also charge other electrical equipment with different voltage levels, thus realizing the functional compatible coupling of the energy storage machine and the charger machine, and saving cost and space.

A thirteenth connection terminal 4-4 and a fourteenth connection terminal 4-5 for connecting with the power conversion module 5 are provided on the top cover 4.

Preferably, the downward projections of the base 1, the battery assembly and the top cover 4 coincide.

Each battery assembly 2 is provided with a fifteenth connection terminal 2-17 and a sixteenth connection terminal 2-18 at the top of the battery assembly 2, and a seventeenth connection terminal 2-19 and an eighteenth connection terminal 2-20 at the bottom of the battery assembly 2. The fifteenth connection terminal 2-17 is connected to the seventeenth connection terminal 2-19 through the internal wiring of the battery assembly 2, and the sixteenth connection terminal 2-18 is connected to the eighteenth connection terminal 2-20 through the internal wiring of the battery assembly 2.

In the two adjacent battery assemblies 2, the eighteenth connection terminal 2-20 of the upper battery assembly 2 is connected to the sixteenth connection terminal 2-18 of the lower battery assembly 2, and the seventeenth connection terminal 2-19 of the upper battery assembly 2 is connected to the fifteenth connection terminal 2-17 of the lower battery assembly 2.

The fifteenth connection terminal 2-17 and the sixteenth connection terminal 2-18 of the M battery assembly are respectively connected to the thirteenth connection terminal 4-4 and the fourteenth connection terminal 4-5.

The base 1 is provided with a nineteenth connection terminal 1-8, a twentieth connection terminal 1-9, a twenty-first connection terminal 1-10, and a twenty-second connection terminal 1-11. The nineteenth connection terminal 1-8 is connected to the twenty-first connection terminal 1-10 through internal wiring, and the twentieth connection terminal 1-9 is connected to the twenty-second connection terminal 1-11 through internal wiring. The seventeenth connection terminal 2-19 and the eighteenth connection terminal 2-20 of the first battery assembly are respectively connected to the nineteenth connection terminal 1-8 and the twentieth connection terminal 1-9.

The battery management module 3 includes a twenty-third connection terminal and a twenty-fourth connection terminal connected to the circuit breaker. The twenty-first connection terminal 1-10 is electrically connected to the twenty-third connection terminal, and the twenty-second connection terminal 1-11 is electrically connected to the twenty-fourth terminal. In this application, the two power harnesses led out from the circuit breaker 3-1 in the battery management module 3 are directly led to the top cover 4 through the transmission of each layer of the battery assemblies 2, and then through the voltage conversion of the power conversion module, the entire energy storage cabinet can also charge other electrical equipment with different voltage levels without additional connection lines.

Specifically, the top cover 4 is provided with a top cover hot-plug assembly 4-1 for integrating the terminals of the fifth connection terminal 4-2, the sixth connection terminal 4-3, the thirteenth connection terminal 4-4 and the fourteenth connection terminal 4-5.

The top of each battery assembly 2 is provided with a hot-plug assembly 2-8 of the first battery for integrating the first connection terminal 2-13, the second connection terminal 2-14, the fifteenth connection terminal 2-17 and the sixteenth connection terminal 2-18.

The bottom of each battery assembly 2 is provided with a hot-plug assembly 2-9 of the second battery for integrating the third connection terminal 2-15, the fourth connection terminal 2-16, the seventeenth connection terminal 2-19 and the eighteenth connection terminal 2-20.

The base 1 is provided with a hot-plug assembly of the first base 1-2 integrating the seventh connection terminal 1-4, the eighth connection terminal 1-5, the nineteenth connection terminal 1-8 and the twentieth connection terminal 1-9.

The base 1 is provided with a hot-plug assembly of the second base 1-3 integrating the ninth connection terminal 1-6, the tenth connection terminal 1-7, the twenty-first connection terminal 1-10 and the twenty-second connection terminal 1-11.

The battery management module 3 is provided with a hot-plug assembly 3-2 of the power supply integrating the eleventh connection terminal 3-5, twelfth connection terminal 3-6, twenty-third connection terminal 3-7 and twenty-fourth connection terminal 3-8.

One of the two adjacent terminals is a male terminal and the other is a female terminal. The electrical connection between the components of the application is realized by mating the male and female ends of the quick-plug terminals, avoiding on-site mounting the wiring, and the mounting is convenient and quick. The quick-plug terminals include the functions of power transmission and signal transmission. Specifically, one of the hot-plug assembly of the first battery 2-8 and the hot-plug assembly of the second battery 2-9 is a male connector terminal, and the other is a female connector terminal.

In a specific embodiment, the first positive terminal 5-1 and the first negative terminal 5-2 of the power conversion module 5 are mounted on the side wall of the top cover 4. The first positive terminal 5-1 and the first negative terminal 5-2 are arranged on the side wall of the top cover 4, which is convenient for overall use even if other structures are mounted above the top cover 4.

The above embodiments are described in a progressive manner. Each of the embodiments is mainly focused on describing its differences from other embodiments, and references may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. An energy storage cabinet, comprising:
a base, wherein the base comprises a first base plug assembly and a second base plug assembly;
a plurality of battery assemblies, wherein the plurality of battery assemblies are stacked in sequence from bottom to top in a height direction, and each battery assembly of the plurality of battery assemblies comprises a first battery plug assembly disposed on a top end of the battery assembly and a second battery plug assembly disposed on a bottom end of the battery assembly, respectively;
a battery management module, wherein the battery management module comprises a power supply plug assembly and a circuit breaker; and
a top cover, wherein the top cover comprises a top cover plug assembly disposed on a bottom end of the top cover;
wherein each battery assembly of the plurality of battery assemblies comprises an outer shell, the outer shell comprises a lower shell with an opening at a top end and an upper cover plate for covering the lower shell, the upper cover plate is detachably connected to the lower shell, and one end of the upper cover plate and a side wall of the lower shell of each battery assembly that extends in the height direction form a U-shaped groove that is recessed inwards in a lengthwise direction of the battery assembly and opens outwards;
a bottom battery assembly of the plurality of battery assemblies is mounted on the base, and the second battery plug assembly of the bottom battery assembly connects with the first base plug assembly of the base;
the battery management module is disposed in the U-shaped groove along the side wall of the lower shell that extends in the height direction of at least the bottom battery assembly and is mounted on the side wall of the lower shell of at least the bottom battery assembly, the power supply plug assembly of the battery management module connects with the second base plug assembly of the base, and the battery management module is electrically connected to each of the plurality of battery assemblies through the base; and
the top cover is mounted on a top battery assembly of the plurality of battery assemblies, and the top cover plug assembly of the top cover connects with the first battery plug assembly of the top battery assembly.

2. The energy storage cabinet according to claim 1, wherein the battery management module is mounted on the base, the battery management module is detachably connected to the base, and the base is detachably connected to the bottom battery assembly.

3. The energy storage cabinet according to claim 1, wherein the battery management module is fixedly connected to the side wall of at least the bottom battery assembly of the plurality of battery assemblies in a detachable manner.

4. The energy storage cabinet according to claim 3, wherein one of the battery management module and at least the bottom battery assembly of the plurality of battery assemblies is provided with a clamping groove, and the other of the battery management module and at least the bottom battery assembly of the plurality of battery assemblies is provided with a buckle for clamping the clamping groove, and when the buckle is matched with the clamping groove, a side wall of the battery management module is fit with the side wall of at least the bottom battery assembly.

5. The energy storage cabinet according to claim 1, wherein two adjacent battery assemblies of the plurality of battery assemblies are fixedly attached to each other in a detachable manner by buckles or threaded fasteners.

6. The energy storage cabinet according to claim 5, wherein the two adjacent battery assemblies are electrically connected through the first battery plug assembly disposed on the top end of a lower one of the two adjacent battery assemblies and the second battery plug assembly disposed on the bottom end of an upper one of the two adjacent battery assemblies, respectively.

7. The energy storage cabinet according to claim 1, wherein a power conversion module is arranged in the top cover and is electrically connected to the top battery assembly through the top cover plug assembly of the top cover and the first battery plug assembly of the top battery assembly, and
the circuit breaker arranged in the battery management module electrically connects the power conversion module and the plurality of battery assemblies.

8. The energy storage cabinet according to claim 7, wherein the power conversion module is a DC-DC voltage converter located in an inner cavity of the top cover and comprises a first positive terminal and a first negative terminal, and interface positions of the first positive terminal and the first negative terminal are disposed on the top cover, for externally connecting with a circuit output of the power conversion module to charge other electrical equipment with different voltage levels.

9. The energy storage cabinet according to claim 7, wherein the top cover is fixedly attached to the top battery assembly in the detachable manner by buckles or threaded fasteners.

10. The energy storage cabinet according to claim 1, wherein a first handle is arranged on the top end of the upper cover plate of each battery assembly, a first limiting groove is arranged at the bottom end of the lower shell of each battery assembly for accommodating the first handle of the adjacent battery assembly, the top end of the base is provided with a second handle mounted in the first limiting groove of the bottom battery assembly, and the bottom end of the top cover is provided with a second limiting groove for mounting the first handle of the top battery assembly.

11. The energy storage cabinet according to claim 10, wherein the first handle is fixedly connected to a side wall of the first limiting groove matched with the first handle in the detachable manner, the second handle is fixedly connected to a side wall of the first limiting groove matched with the second handle in the detachable manner, and the first handle is fixedly connected to a side wall of the second limiting groove matched with the first handle in the detachable manner.

12. The energy storage cabinet according to claim 1, wherein the outer shell of at least the top battery assembly further comprises a sealing plate for sealing a side opening of the U-shaped groove of the lower shell of at least the top battery assembly, and the sealing plate is detachably connected to the lower shell of at least the top battery assembly.

13. The energy storage cabinet according to claim 12, wherein opposite side walls of the lower shell of at least the top battery assembly are provided with U-shaped sliding grooves with upper openings, and the sealing plate is slidably arranged in the U-shaped sliding grooves of at least the top battery assembly, wherein opposite ends of the sealing plate respectively extend into the corresponding U-shaped sliding grooves, and the sealing plate is arranged above the battery management module and below the top cover in the height direction.

14. The energy storage cabinet according to claim 1, wherein the first base plug assembly and the second base plug assembly of the base, the first battery plug assembly and the second battery plug assembly of each battery assembly, the power supply plug assembly of the battery management module, and the top cover plug assembly of the top cover are quick-plug terminals configured for power transmission and signal transmission;
orthographic projections of the top cover and the plurality of battery assemblies from top to bottom in the height direction are within an orthographic projection of the base; and
the second base plug assembly of the base is within an orthographic projection of the U-shaped groove of at least the bottom battery assembly of the plurality of battery assemblies from top to bottom in the height direction, and aligns with the power supply plug assembly of the battery management module.

15. The energy storage cabinet according to claim 1, wherein the top end of the upper cover plate of each battery assembly is provided with two first handles, and the bottom end of the lower shell of each battery assembly is provided with two first limiting grooves for accommodating the two first handles on the adjacent battery assembly, wherein the two first handles are in one-to-one correspondence with the two first limiting grooves, respectively.

16. The energy storage cabinet according to claim 1, wherein the lower shell of each battery assembly comprises a short side wall and a long side wall perpendicular to the short side wall, the short side wall is the side wall of the lower shell that forms the U-shaped groove of each battery assembly, and the battery management module is mounted on the short side wall of the lower shell of at least the bottom battery assembly.

17. The energy storage cabinet according to claim 1, wherein the first base plug assembly and the second base plug assembly are disposed on a top end of the base, the power supply plug assembly is disposed on a bottom end of the battery management module, and the battery management module is mounted on the top end of the base.

18. The energy storage cabinet according to claim 1, wherein the battery management module comprises a second positive connector and a second negative connector disposed on the battery management module and connected with the circuit breaker.

* * * * *